United States Patent Office 3,500,505
Patented Mar. 17, 1970

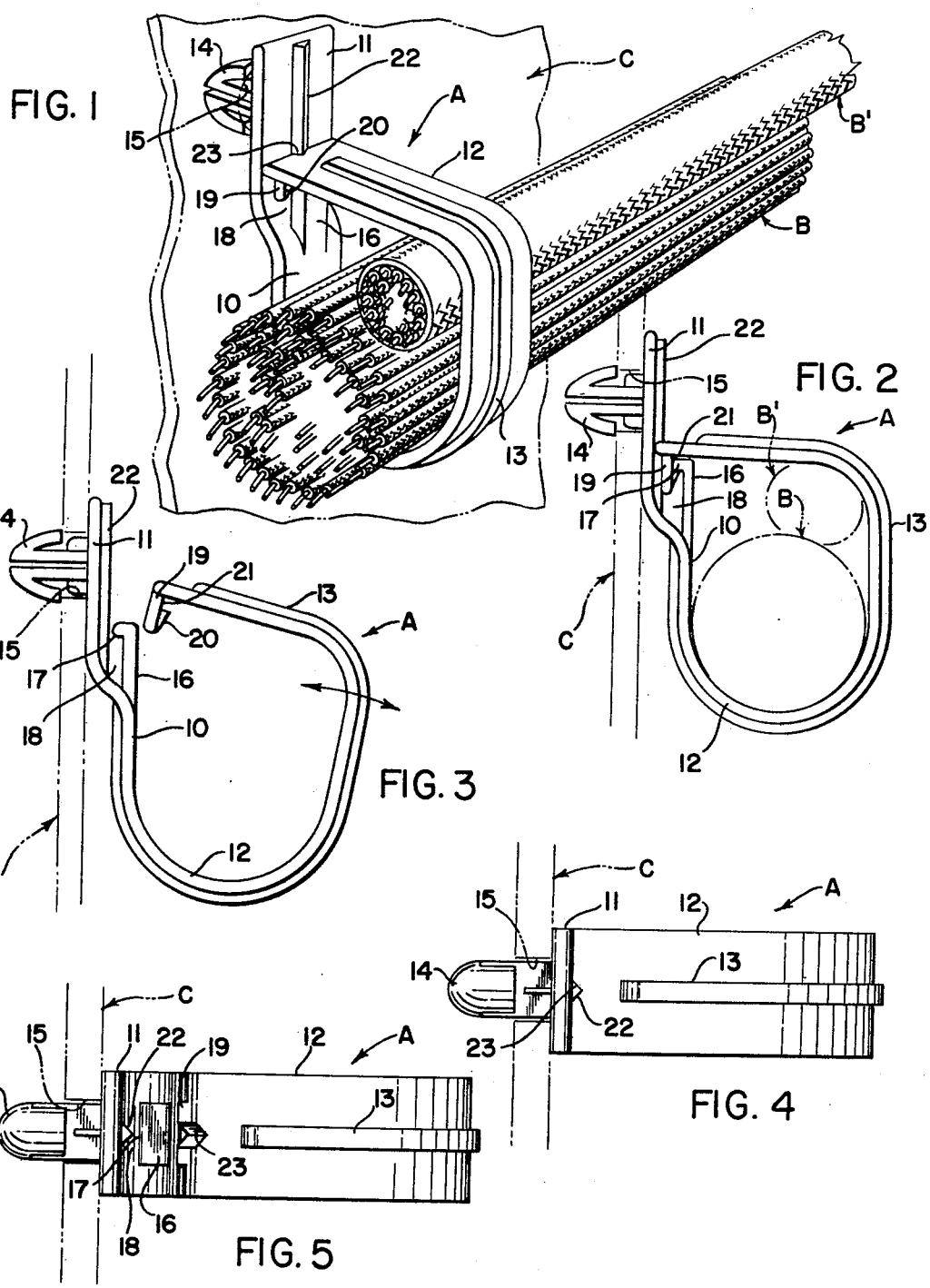

3,500,505
HANGER FOR WIRE BUNDLES
John P. Thompson, Fairview Park, Ohio, assignor to Thogus Products Company, Cleveland, Ohio, a corporation of Ohio
Filed Aug. 7, 1968, Ser. No. 750,889
Int. Cl. B65d 63/00
U.S. Cl. 24—16                                6 Claims

ABSTRACT OF THE DISCLOSURE

A hanger for holding a bundle of wires, cables, flexible tubing or the like and securing it to a structural member such as in an automotive vehicle. The hanger comprises a resilient strap formed into a loop which opens sufficiently to admit the bundle to be secured, the loop having interconnectable ends that latch together when manipulated to a closed position. The latch mechanism prevents lateral movement of the ends of the strap relative to one another and will not release in response to inadvertent forces acting on the wire bundle or on the loop.

BACKGROUND OF THE INVENTION

My invention relates to hangers for bundles of wires, cables, flexible tubing or the like which hold the bundle together and secure it to a structural member such as the fire wall of an automobile. More particularly my invention relates to a novel latching mechanism for selectively connecting the ends of the loop part around the particular bundle to be secured. Hangers of this type are most commonly fabricated of molded thermoplastics and include an integral fastening element which when pressed through a small hole in a thin wall of metal sheet or the like serves to secure the hanger in a desired position. A fastening means is illustrated in my prior U.S. Patent No. 3,213,500.

It is important that such hangers be capable of manual manipulation when placing them around the bundle and securing it to the structural member. Where the hanger is adapted for manipulation without special tools it facilitates and expedites assembly of the product, such as an automobile, in which the bundle is located. Furthermore it is important that the hanger be capable of gripping the bundle firmly to reduce vibration and that it not become unlatched inadvertently during other subsequent assembly steps or when the vehicle is in service. Also it is important that the latch mechanism be selectively releasable in order to facilitate replacement and repair of the wires, cables, flexible tubing, etc.

Prior art hangers have not had a satisfactory, fool-proof latching means in that in most instances it has been necessary to force the ends of the loop together to compress the loop and bundle therein while simultaneously placing the latching elements in cooperating relationship and thereafter to release the ends which in response to the resilience of the material tend to expand the loop until the ends interlock with one another. Prior latch constructions are vulnerable to inadvertent release by forces tending to compress the loop or to move one end of the loop laterally relative to the other, out of the plane of the loop.

The hanger of my invention reduces the difficulties indicated above and affords other features and advantages not obtainable in the prior art.

SUMMARY OF THE INVENTION

It is a general object of my invention to releasably latch together the ends of a hanger for a bundle of wires, cables, flexible tubing or the like in such a way as to obviate the inadvertent release of the latching mechanism by forces acting on the hardness and hanger.

Another object is to obviate lateral movement of the latched ends of a hanger of the type described out of the plane of the loop formed by the device when encircling and holding a cable harness.

These and other objects are accomplished by a hanger comprising a resilient strap formed into a loop for encircling a bundle or more than one bundle of wires or the like; the loop having its ends movable in the plane of the loop from a stressed closed position to an open position wherein the ends are spaced apart sufficiently to admit the bundle or bundles into the loop. One of the ends of the strap loop has a resilient latch formed in its inner surface which defines with the abjacent portion of the strap, a channel perpendicular to the plane of the loop. A catch formed on the opposite end of the strap loop cooperates with the latch when received in the channel to positively lock the catch therein so as to obviate removal in the absence of manual manipulation of the latch. The portion of the strap defining the channel, and the catch are provided with cooperating means to obviate relative lateral movement thereof perpendicular to the plane of the loop when in their latched condition. The resilient latch is stressed when the catch is forced into the channel but is relieved when full insertion is achieved and moves to a relaxed position which serves to positively lock the catch in the channel.

Other objects, uses and advantages of the invention will be apparent from the following detailed description and drawings.

BRIEF DESCRIPTION OF THE DRAWINGS

FIGURE 1 is a perspective view showing a hanger embodying the invention and illustrating the loop of the hanger encircling bundles of wires in its latched condition;

FIGURE 2 is an elevational view of the hanger of FIGURE 1 drawn to a scale of twice its actual size and showing the loop of the hanger in its closed and latched condition as in FIGURE 1;

FIGURE 3 is a side elevational view similar to FIGURE 2 and drawn to the same scale but showing the loop of the hanger in its open position;

FIGURE 4 is a plan view of the hanger of FIGURE 1 drawn to a larger scale and showing the loop of the hanger in its closed position as in FIGURES 1 and 2; and FIGURE 5 is a plan view similar to FIGURE 4 and drawn to the same scale but showing the loop of the hanger in its open position as in FIGURE 3.

DESCRIPTION OF THE PREFERRED EMBODIMENT

Referring more particularly to the drawings there is shown a hanger A embodying the invention and being used to secure a wire bundle B including a cable B' to a structural wall C. The hanger A is molded of a thermoplastic material such as nylon although other thermoplastics such as one of the polyvinylchlorides or polypropylene may also be used. It is molded in approximately the condition shown in FIGURE 3 and is inherently resilient to permit the various manipulations to be described below.

The hanger A comprises a strap 10 convoluted as shown and providing in anchor plate 11 at one end and a loop portion 12 at the other end, the loop portion having an outside reinforcing rib 13 for increased strength.

On the back of the anchor plate 11 is an integral fastening element 14 of the type described in my earlier U.S. Patent No. 3,213,500. The element 14, when pressed through a small aperture 15 in the structural wall C, expands to secure the hanger A to the wall as best shown in FIGURES 2 and 3.

The loop portion 12 of the hanger A has sufficient resiliency to permit it to be opened wide enough to receive the wire bundle B. Once the bundle B is in position the ends of the loop portion may be brought together and latched according to the novel latching mechanism of my invention.

The latching mechanism includes cooperating elements on opposite ends of the loop portion 12 and provides a positive latching connection which cannot release without selective manipulation of the latching mechanism itself. The mechanism includes on the one hand a resilient latch 16 extending out from the strap 10 at the end of the loop portion 12 adjacent the anchor plate 11. The latch has a tongue 17 extending toward the plate 11 and the latch 16 and plate 11 define therebetween a channel 18 which receives a catch 19 located on the opposite end of the loop portion 12.

The catch 19 extends perpendicular to the strap 10 at the opposite end of the loop portion 12 and has an inwardly extending lip 20 which defines a groove 21 with the base of the catch and adjacent inner face of the strap 10.

The outer surface of the anchor plate 11 has a wedge-shaped ridge 22 which is received in a matching slot 23 formed on the outer surface of the catch 19 when the ends of the loop portion 12 are latched together as best shown in FIGURE 4. The ridge 22 and slot 23 prevent relative lateral movement of the ends of the loop portion 12 when latched together and thus obviate any accidental release of the latch due to lateral forces acting on the hanger A.

The latching together of the ends of the loop portion 12 is best illustrated in FIGURES 1 and 2. It will be seen that when the outer end of the loop portion 12 is pushed against the anchor plate 11 to reduce the size of the loop and the catch 19 pushed down into the channel 18 defined by the lower part of the anchor plate 11 and the resilient latch 16, the latch 16 will be flexed away from the plate 11 until the lip 20 is moved below the tongue 17 at which time the tongue 17 will snap into the groove 21 thus positively locking the catch 19 in the channel 18. In this condition the latch mechanism can only be released by inserting an appropriate tool into the channel 18 and forcing the resilient latch 16 away from the plate 11 to remove the tongue 17 from the groove 21. When this is done the resilience of the loop portion 12 will snap the catch 19 out of the channel 18 and thus release the latch mechanism.

It will be seen that latching occurs when the ends of the loop are moved to the position providing the minimum loop size so that the clamping pressure on the wire bundle will remain at its maximum level and not be slightly relieved after latching occurs.

While my invention has been shown and described with reference to a specific embodiment thereof this is intended for the purpose of illustration rather than limitation and variations, modifications will become apparent to those skilled in the art within the intended spirit and scope of the invention as herein specifically illustrated and described. Therefore the patent is not to be limited in scope and effect to the preferred form shown herein nor in any other way that is inconsistent with the extent to which the progress in the art has been advanced by the invention.

I claim:

1. In a hanger for holding and securing a bundle of wire, cables, flexible tubing and the like comprising a resilient strap having a loop portion for encircling said bundle, said loop having ends movable relative to one another in the plane of said loop between an open position for admitting said bundle into said loop and a closed portion embracing said bundle; the improvement which comprises a resilient latch at one of said ends spaced from an adjacent part of said strap and adapted to be flexed relative thereto in the plane of said loop, and a catch formed at the other of said ends, said catch being slidably receivable between and contacting said latch and said part when said ends are moved to said closed position, and said catch being adapted to flex said latch away from said part when being inserted between said part and said latch, to lock said catch therein and to secure said ends in said closed position.

2. A hanger as defined in claim 1 including means for restraining lateral movement of said ends relative to one another outside of the plane of said loop when in their closed position.

3. A hanger as defined in claim 2 wherein said means for restraining lateral movement comprises a longitudinal ridge formed on said strap part and means defining a matching longitudinal groove in said catch which receives said ridge when said ends are in said closed interconnected position.

4. A hanger as defined in claim 3 wherein said ridge has a wedge-shaped cross section.

5. A hanger as defined in claim 1 wherein the ends of said loop meet at substantially right angles when in their closed interconnected position and wherein said catch extends perpendicularly to its respective end.

6. A hanger as defined in claim 1 wherein said catch defines a groove and said latch has a tongue receivable in said groove when said catch is fully inserted.

References Cited

UNITED STATES PATENTS

| 2,340,713 | 2/1944 | Tinnerman | 248—74 |
| 2,352,856 | 7/1944 | Morehouse | 248—74 |
| 3,049,771 | 8/1962 | Litwin et al. | |
| 3,090,826 | 5/1963 | Cochran. | |
| 3,126,185 | 3/1964 | Christman. | |
| 3,213,500 | 10/1965 | Thompson. | |
| 3,232,569 | 2/1966 | Deardore | 248—74 |

DONALD A. GRIFFIN, Primary Examiner

U.S. Cl. X.R.

248—74